United States Patent
Lin et al.

(10) Patent No.: US 7,512,758 B2
(45) Date of Patent: *Mar. 31, 2009

(54) SYSTEM AND METHOD FOR PROVIDING BACKUP SERVICE CONTINUITY USING A VIRTUAL BACKUP SERVICE PATH

(75) Inventors: Tzu-How Lin, Taipei (TW); Sung-Yen Chang, Pingjhen (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/867,785

(22) Filed: Oct. 5, 2007

(65) Prior Publication Data
US 2008/0028259 A1  Jan. 31, 2008

Related U.S. Application Data

(63) Continuation of application No. 10/864,776, filed on Jun. 9, 2004, now Pat. No. 7,299,326.

(51) Int. Cl.
*G06F 12/00* (2006.01)
(52) U.S. Cl. .................. 711/162; 707/204
(58) Field of Classification Search .......... 711/162; 709/240; 707/204
See application file for complete search history.

(56) References Cited

U.S. PATENT DOCUMENTS

| | | | |
|---|---|---|---|
| 2002/0188733 A1* | 12/2002 | Collins et al. | 709/229 |
| 2005/0004978 A1* | 1/2005 | Reed et al. | 709/203 |
| 2005/0050271 A1* | 3/2005 | Honda et al. | 711/114 |
| 2005/0055521 A1* | 3/2005 | Saika | 711/162 |
| 2005/0181503 A1 | 8/2005 | Goldman et al. | |
| 2006/0098572 A1* | 5/2006 | Zhang et al. | 370/229 |

* cited by examiner

*Primary Examiner*—Kevin L Ellis
*Assistant Examiner*—Hashem Farrokh
(74) *Attorney, Agent, or Firm*—Haynes and Boone, LLP (57) ABSTRACT

Provided are a system and method for using a plurality of virtual backup service paths to dynamically switch between storage devices based on a plurality of scenarios. In one example multiple backup service groups are defined. Multiple scenarios that each reference at least one virtual backup service path are also defined. Each virtual backup service path may be defined by at least one network address identifying a storage device. One of the scenarios is selected based on a service level of one or more storage devices, and the virtual backup service path identified by the selected scenario is chosen as a backup destination for at least one of the service groups.

7 Claims, 7 Drawing Sheets

SYSTEM AND METHOD FOR PROVIDING BACKUP SERVICE CONTINUITY USING A VIRTUAL BACKUP SERVICE PATH

CROSS-REFERENCE

This application is a Continuation of U.S. application Ser. No. 10/864,776 now U.S. Pat. No. 7,299,326, filed Jun. 9, 2004, the disclosure of which is incorporated herein by reference.

BACKGROUND

In a semiconductor manufacturing business, such as a semiconductor foundry business, information technology (IT) services provide cohesion and support both internally and externally. For example, IT services in a foundry business may provide operations to support a network of processing equipment, computing devices, robotics, customers, and manufacturing equipment. One operation performed by IT services is the storage and retrieval of information associated with customers and their products, as well as information associated with the various devices connected to the network. Such information is often duplicated by backing the information up to networked storage devices. However, difficulties may arise when backing up such information if the storage device fails or is inaccessible due to maintenance or other concerns. When this occurs, the backup operation may be halted or delayed until the problem is rectified. Such interruptions in the backup process may result in a loss of productivity, as well as a loss of customer information.

Accordingly, what is needed is a system and method that addresses the above discussed issues.

DETAILED DESCRIPTION

The present disclosure relates generally to a system and method for transferring information between computing entities of a semiconductor product manufacturing facility and, more specifically, to using virtual paths to provide backup service continuity. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
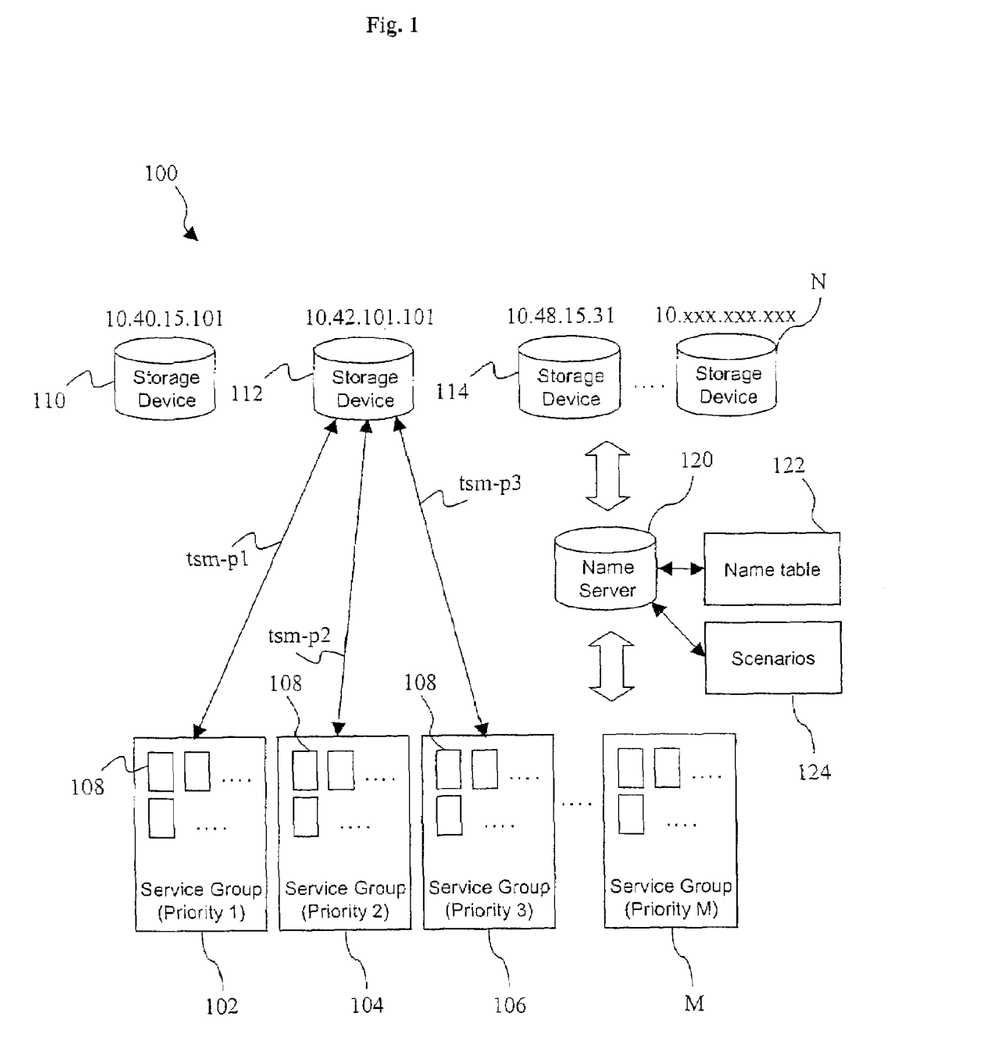
FIG. 1 illustrates an exemplary system that uses virtual paths to switch between multiple storage devices based on a plurality of scenarios.

Referring to FIG. 1, in one embodiment, an information transfer system 100 (e.g., a backup system) enables information to be duplicated and stored (e.g., backed up) even when a designated storage device fails. As will be described later in greater detail, the information transfer system 100 provides for automatically and dynamically selecting alternate storage devices for backup purposes without needing client side changes when one or more designated storage devices fails or is otherwise inaccessible (e.g., has been taken offline for maintenance purposes, has no additional capacity, etc.).

The information transfer system 100 includes a plurality of service groups 102, 104, 106, ..., M that are sources of information, a plurality of storage devices 110, 112, 114, ..., N that are storage destinations for information, a server 120 that maintains network identifiers (e.g., addresses) of at least some of the storage devices 110-N, a name table 122 containing at least one backup device name that is associated with the network identifier of one of the storage devices 110-N, and one or more predefined scenarios 124. The name table 122 and scenarios 124 may be maintained on the server 120 or may be maintained elsewhere.

The service group(s) 102-M may each contain one or more clients 108. The clients 108 may include desktop computing devices, portable and hand held computing devices (e.g., laptop computers, cellular telephones, personal digital assistants, etc.), and/or other computing devices, as well as computing devices integrated into manufacturing equipment. It is understood that these are only examples and that the clients 108 may include any device containing data that may access the information transfer system 100 either directly or indirectly. The clients 108 may store information associated with customers and their products, process instructions, process logs, and/or other operational instructions, and may communicate with other entities through wired or wireless connections. Wired connections may include local area network (LAN), wide area network (WAN), Ethernet, and/or other direct wire connections and protocols, while wireless connections may include BlueTooth®, 802.11b, 802.11g, and/or other wireless communication protocols.

The clients 108 may be assigned to one of the service groups 102-M, although it is understood that a client itself may represent a service group. The service groups 102-M may represent, for example, a cluster of tools, a number of customers assigned to a particular fabrication facility, an engineering section, a work group operation section, or any other grouping that is desirable. In some embodiments, each service group may be further divided into subgroups. For example, there may be a manufacturing group with a product design subgroup, a manufacturing process subgroup, an administration subgroup, an information technology subgroup, and/or other subgroups.

In the present example, the service groups 102-M represent customers and are assigned priority levels, with the service group 102 having the highest priority (e.g., Priority 1), the service group 104 having the second highest priority (e.g., Priority 2), the service group 106 having the third highest priority (e.g., Priority 3), and the service group M having the lowest priority (e.g., Priority M). It is understood that multiple service groups may be assigned the same level of priority. Each service group (or priority level in the present example) may be assigned a backup name (e.g., tsm-p1 for priority level 1; tsm-p2 for priority level 2; tsm-p3 for priority level 3, etc.) that may be used by the service group to request an identity the storage device that is designated for storing information coming from that service group.

The storage devices 110-N may each include one or more virtual or physical storage devices able to store information. Each storage device may have a single memory or may include multiple memories, which may be segmented or distributed. Each storage device may have a single memory or may include multiple memories, which may be segmented or distributed. It is understood that the term memory includes any medium capable of storing data, including magnetic and optical media. Accordingly, a storage device may be a tape, disk, compact disk, hard drive, flash memory card, or any other type of magnetic and/or optical storage, or may be a storage device based on other technologies. In addition, the term storage device, as used in the present disclosure, may include any needed hardware/software (e.g., a tape drive able to write to a magnetic tape). Each storage device may be associated with a service level, which may take into account such factors as the storage device's availability, capacity, performance, and/or other features. Furthermore, each storage device may include one or more media access control (MAC) addresses associated with one or more network interface card (NICs). If a storage device has multiple NICs, it is understood that inbound and outbound traffic may be balanced among the NICs using a traffic balancing module.

The name server 120, in conjunction with the name table 122, may be responsible for responding to requests from the service groups (or devices within the service groups) for the network identifier associated with the relevant backup name. In the present example, the server 120 is a Domain Name Server (DNS) and the network identifiers are Internet Protocol (IP) addresses. As illustrated, each storage device 110-N is associated with a particular IP address. Accordingly, the DNS server 120 maintains a list of the IP addresses of each of the storage devices 110-N. Furthermore, the DNS server 120 maintains the name table 122, which associates each backup name with one or more of the IP addresses, as represented below in Table 1.

TABLE 1

| DNS Name | IP address |
|---|---|
| tsm-p1 | 10.42.101.101 |
| tsm-p2 | 10.42.101.101 |
| tsm-p3 | 10.42.101.101 |

In the present embodiment, as illustrated by Table 1, the storage device 112 (having the IP address 10.42.101.101) is designated as the storage device for priority levels 1-3 (tsm-p1, tsm-p2, and tsm-p3, respectively). Accordingly, as illustrated in FIG. 1, information from each of the service groups 102, 104, 106 (e.g., service groups associated with priority levels 1-3) will be stored within the storage device 112.

Figure 2:
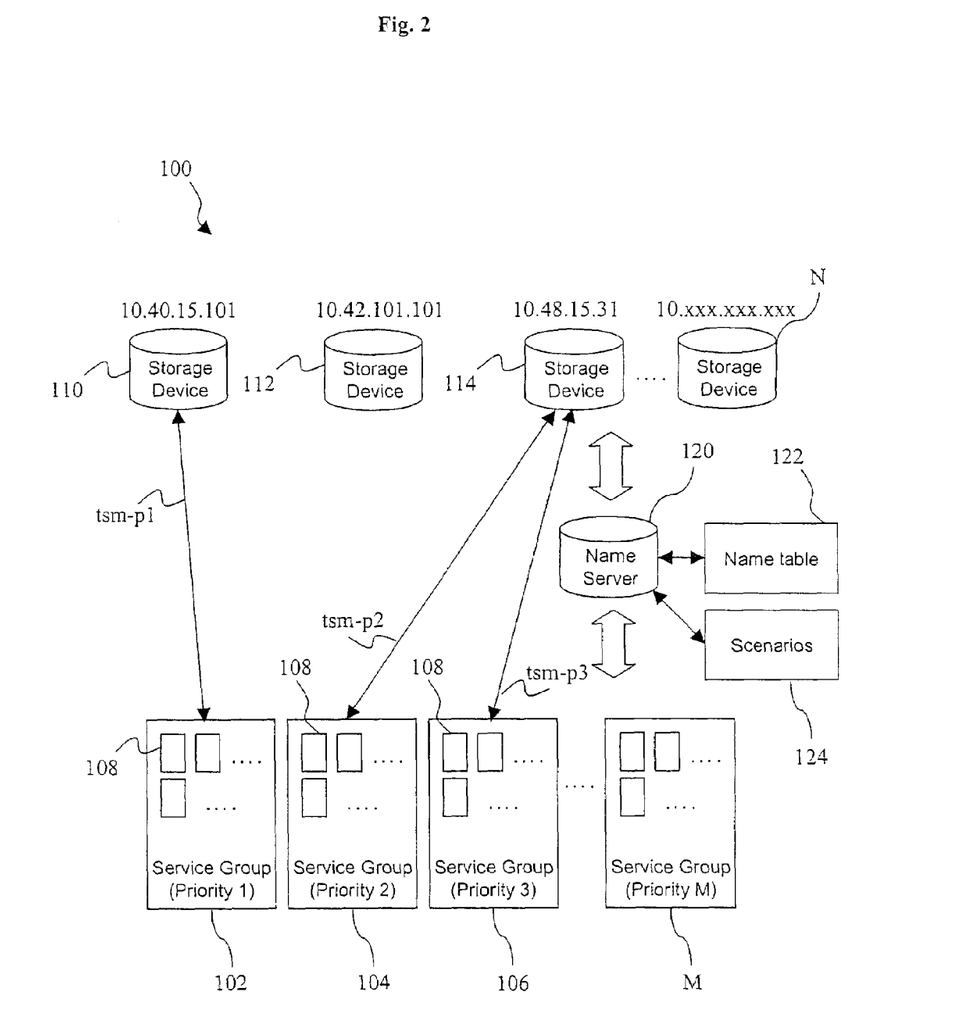
FIG. 2 illustrates the system of FIG. 1 after a switch in storage devices has occurred.

Referring now to FIG. 2, the storage device 112 may be inaccessible (e.g., denoted as not usable by the service level) when a backup is to occur. The inaccessibility may be due to lack of capacity, to failure, to being taken offline for maintenance, or for other reasons. This inaccessibility means that Table 1 (representing the name table 122) provides unusable addresses for current data storage purposes.

To resolve this problem, the DNS server 120 may alter the name table 122 using one of the predefined scenarios 124. For example, the scenario may define that, if the storage device 112 is unavailable, traffic destined to the storage device 112 should be rerouted. The rerouting may be predetermined (e.g., reroute all traffic to the storage device 110), it may be dynamically determined (e.g., reroute all traffic to the storage device having the least load or the highest available capacity) or it may be a combination of predetermined and dynamically determined criteria (e.g., split the traffic into two portions based on priority and route each portion to the two storage devices having the most available bandwidth). Furthermore, in some embodiments, the service groups may be queued based on priority level or other criteria (e.g., time elapsed since previous backup) to ensure that certain service groups are backed up before other service groups.

It is understood that many different scenarios may be constructed, with each scenario dealing with different variations of a similar occurrence. For example, a single scenario may be constructed to deal with the inaccessibility of the storage device 112, or multiple scenarios may be constructed based on the inaccessibility of the storage device 112 and a combination of one or more other factors, such as the number or priority of service groups attempting to access the storage device 112 when the inaccessibility occurs. An exemplary set of four scenarios is provided in Table 2 (below).

TABLE 2

| | SD 1 | SD 2 | SD 3 | tsm-p1 default | tsm-p2 default | tsm-p3 default | tsm-p1 next | tsm-p2 next | tsm-p3 next |
|---|---|---|---|---|---|---|---|---|---|
| Scenario 1 | A | A | U | SD 2 | SD 2 | SD 2 | N/A | N/A | N/A |
| Scenario 2 | A | U | A | SD 2 | SD 2 | SD 2 | SD 1 | SD 3 | SD 3 |
| Scenario 3 | U | A | A | SD 2 | SD 2 | SD 2 | N/A | N/A | N/A |
| Scenario 4 | A | U | U | SD 2 | SD 2 | SD 2 | SD 1 | SD 1 | SD 1 |

As illustrated in Table 2, scenario 1 covers the situation where storage devices 1 and 2 (e.g., the storage devices 110 and 112) are available and storage device 3 (e.g., the storage device 114) is unavailable. The default storage device for each priority level tsm-p1, tsm-p2, and tsm-p3 is storage device 2 (the storage device 112). The virtual paths to be used in each scenario may be the default paths (as shown in scenario 1) or may be alternate paths (as shown in scenarios 2 and 4) that are defined in the columns entitled "tsm-p1 next", "tsm-p2 next", and "tsm-p3 next". It is understood that Table 2 may contain addresses of the storage devices, as well as additional or alternate criteria. Furthermore, Table 2 may be implemented in many different ways, rather than as an actual table. In some embodiments, the name table 122 may be combined with the scenarios 124.

In the present example, as illustrated in Table 3 (below), the DNS server 120 alters the name table 122 to route the priority 1 service group (e.g., the service group 102) to the storage device 110, and the priority 2 and 3 service groups (e.g., the service groups 104, 106) to the storage device 114. This corresponds to scenario 2 of Table 2.

TABLE 3

| DNS Name | IP address |
| --- | --- |
| tsm-p1 | 10.40.15.101 |
| tsm-p2 | 10.48.15.31 |
| tsm-p3 | 10.48.15.31 |

Accordingly, each of the service groups 102-106 may backup the information without requiring a change to the service group or the clients within the service group. It is understood that alternate routing may be provided. For example, the service groups 102, 104, 106 may be routed to a single storage device or each service group may be routed to a separate storage device.

Figure 3:
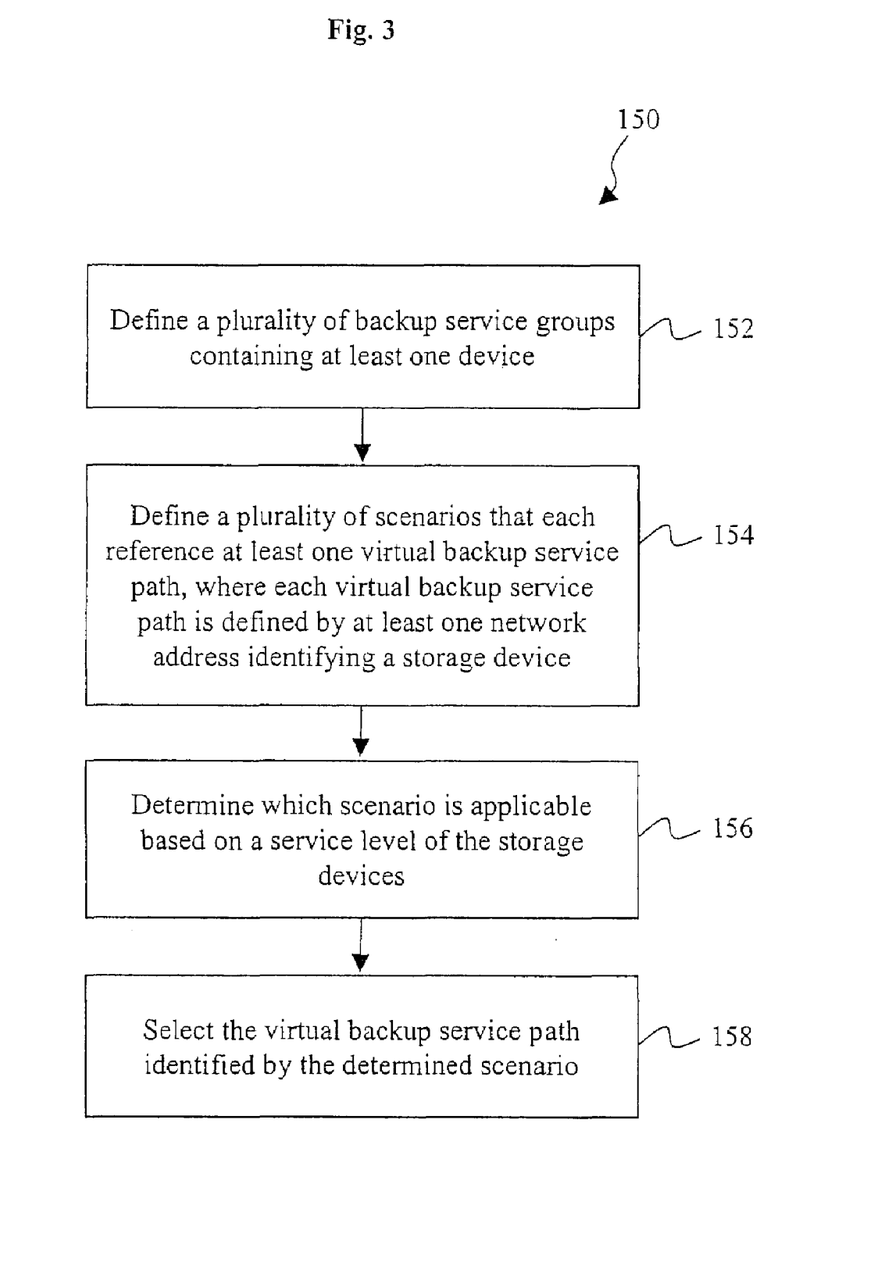
FIG. 3 is a flow chart of an exemplary method that may be executed within the system of FIG. 1 to enable dynamic switching from a designated storage device to one or more alternate storage devices.

Referring now to FIG. 3, a method 150 may be executed within the information transfer system 100 of FIGS. 1 and 2 to store information to an alternate storage device when a designated storage device is inaccessible (e.g., denoted as not usable by the associated service level). As described with respect to FIGS. 1 and 2, each of the designated and alternate storage devices may be identified on a network by a network identifier (e.g., a network address or alias).

In step 152, multiple backup service groups may be defined. As previously described, each backup service group may include one or more devices that contain information that needs to be backed up. In step 154, a plurality of scenarios may be defined. Each scenario may reference at least one virtual backup service path that may be defined by at least one network address identifying a storage device. It is understood that multiple network addresses may form a virtual service path in some examples. In step 156, a determination may be made as to which scenario is applicable based on the service level associated with each of the storage devices. As previously described, the service level may include, for example, one or more of a capacity, a performance level, or an availability of a respective storage device. For example, if a service level associated with one of the storage devices indicates that the storage device is not available, then the scenario may be selected based on the unavailability of that particular storage device. In step 158, the virtual backup service path identified by the applicable scenario may be selected. This provides the network address associated with the storage device that is to be used to store the information. Information from at least one of the backup service groups may then be stored using the selected virtual backup service path.

In some embodiments, the method 150 may include assigning a priority level to at least some of the backup service groups as previously described. This enables the storage of information from the backup service groups to be prioritized, so information from backup service groups with a higher priority level may be stored before information from backup service groups with a lower priority level.

It is understood that one or both of the designated storage devices may include multiple storage devices. Furthermore, the scenario may switch different backup service groups to different alternate storage devices, even if the backup service groups were assigned to the same designated storage device. In addition, a backup service group may be subdivided and the subdivisions may be switched to different storage devices. For example, different clients within the backup service group may be assigned to different alternate storage devices. Alternatively or simultaneously, a first alternate storage device may be used until it reaches its storage capacity, and then a second alternate storage device may be used. Accordingly, a scenario may incorporate a variety of different relationships between a backup service group and one or more storage devices.

Figure 4:
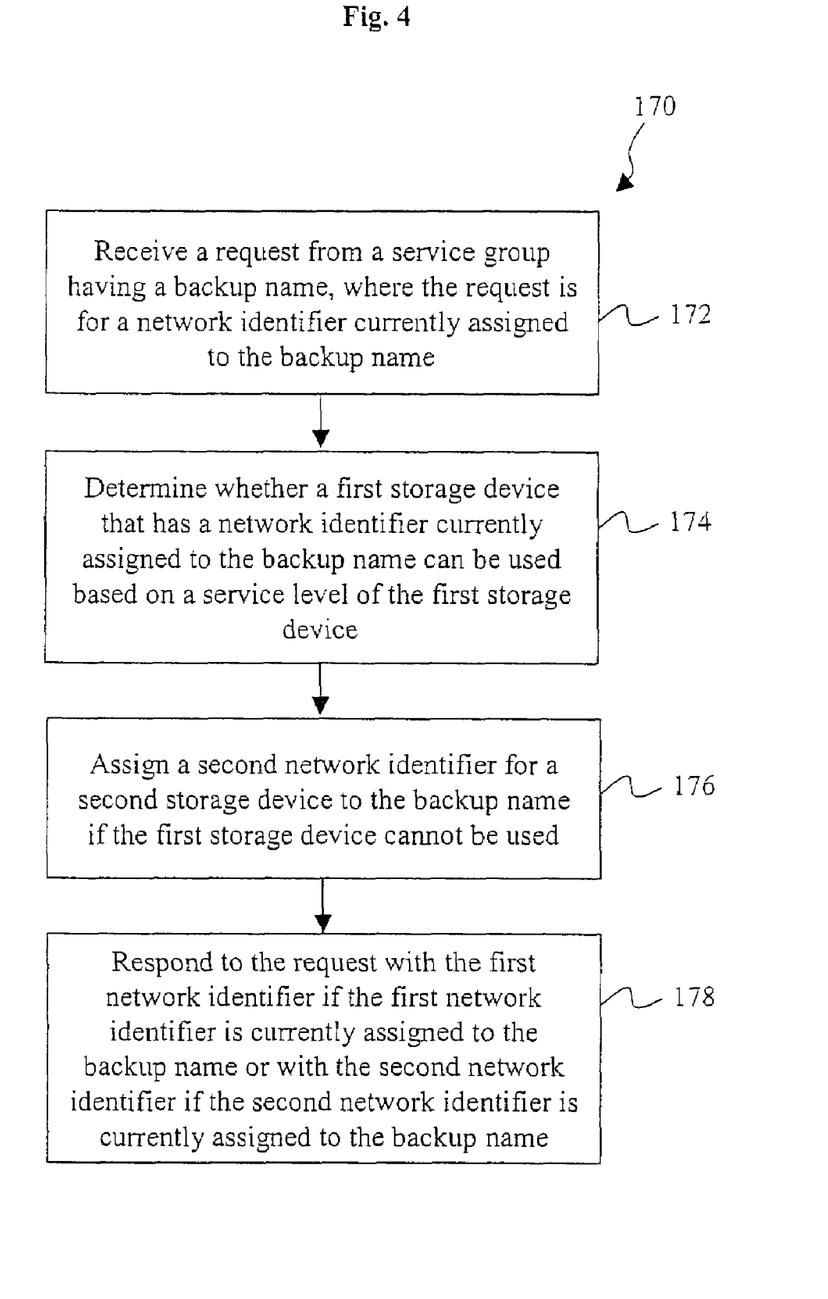
FIG. 4 is a flow chart of an exemplary method that may be executed within the system of FIG. 1 to switch between storage devices.

Referring now to FIG. 4, a method 170 may be executed within the information transfer system 100 of FIGS. 1 and 2 to dynamically switch to an alternate storage device when a designated storage device is not accessible. As described with respect to FIGS. 1 and 2, each of the designated and alternate storage devices may be identified on a network by a network identifier (e.g., a network address or alias).

In step 172, a request may be received from a service group having a backup name. In the present example, the network identifier of the designated storage device is currently assigned to the backup name. In step 174, a determination may be made as to whether the designated storage device can be used to receive data based on the service level of the designated storage device. The service level may include, for example, a capacity, a performance level, and/or an availability of the designated storage device. In step 176, the network identifier of an alternate storage device is assigned to the backup name if the designated storage device is not available to receive data. As previously described, the designated storage device may be unavailable due to failure, maintenance, or other issues. In step 178, a response to the request may be sent with the first network identifier if the first network identifier is currently assigned to the backup name, or with the second network identifier if the second network identifier is currently assigned to the backup name.

It is understood that, before assigning the network identifier of the alternate storage device to the backup name, an accessibility of the alternate storage device may be determined using the alternate storage device's service level. If it is inaccessible, another storage device may be selected, checked for availability, etc. In some embodiments, the method 170 may include storing the data on either the designated or alternate storage device based on the network identifier currently assigned to the backup name. In other embodiments, the method 170 may include assigning a priority level to the service group. If other service groups are also requesting data storage and there are insufficient storage devices, then the priority level may be used to determine an order in which data from the service groups is stored. The priority level may also be used to determine the storage device(s) on which a service group's data is to be stored.

Figure 5:
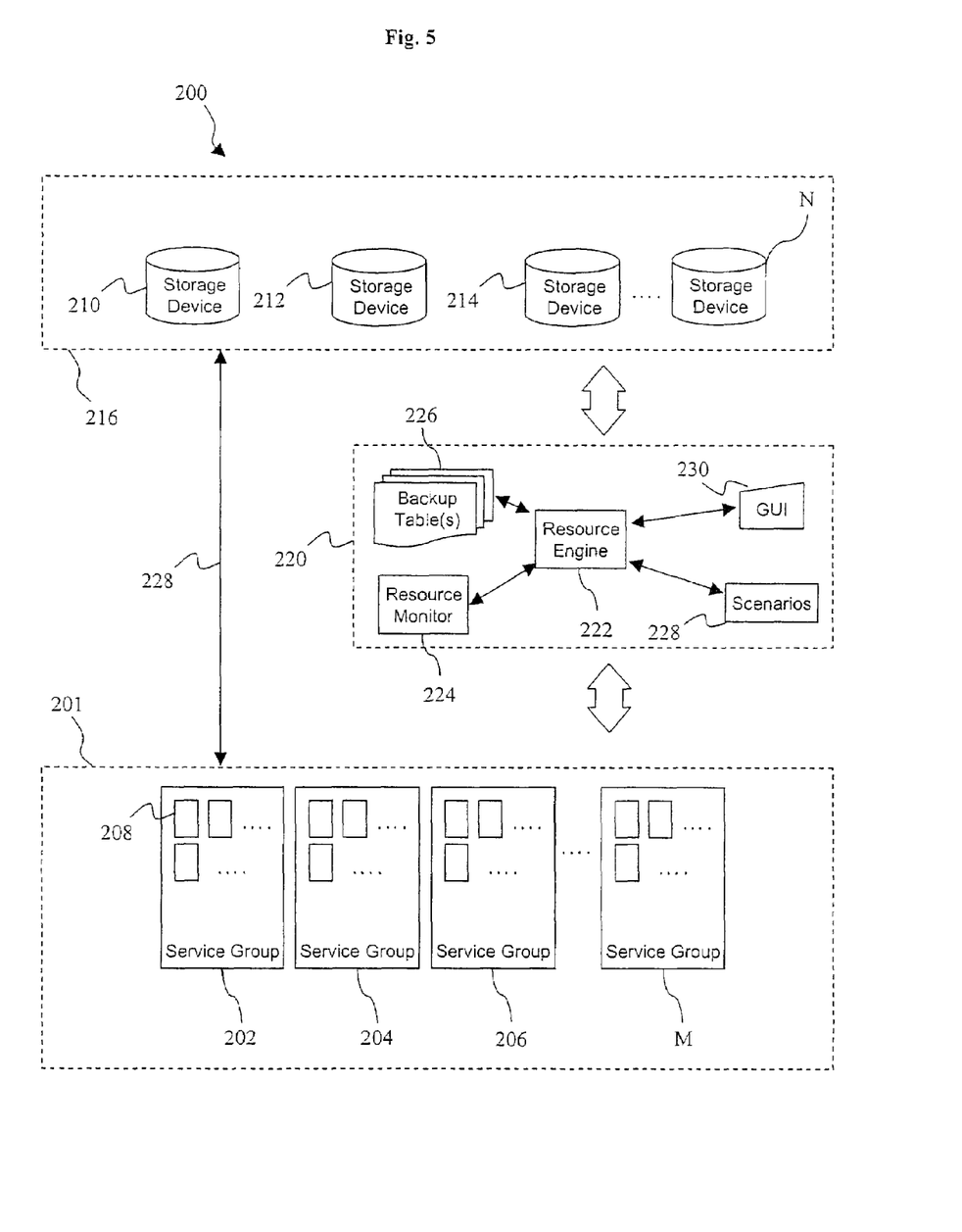
FIG. 5 illustrates an exemplary system that may monitor storage device resources to maintain a backup table of virtual paths.

Referring now to FIG. 5, in another embodiment, an information transfer system 200 may provide for monitoring storage devices and updating a table indicating which storage device a particular service group should use for backup purposes. This may be accomplished using virtual backup service paths to dynamically switch between storage devices without needing to make changes to the service group.

The information transfer system 200 includes a plurality of service groups 202, 204, 206, . . . , M that are sources of information (illustrated as a service group 201 for purposes of convenience), a plurality of storage devices 210, 212, 214, . . . , N that are storage destinations for information (illustrated as a storage device group 216 for purposes of convenience), and a monitor module 220 that includes a resource engine 222, a resource monitor 224, a backup table (or tables) 226 containing at least one backup device name that is associated with a network identifier of one of the storage devices 210-N, one or more predefined scenarios 228, and a graphical user interface (GUI) 230. Although illustrated as a single resource module 220, it is understood that the resource engine 222, resource monitor 224, backup table 226, scenarios 228, and GUI 230 may be distributed.

In some embodiments, the information transfer system 200 may include a name server (not shown), such as the name server 120 of FIG. 1. The name server may enable the resource engine 222 to receive and respond to requests from the service groups 202-M for network identifiers identifying a storage device for backup. In other embodiments, the resource module 220 may include instructions enabling the resource module to receive and respond to such requests, or the resource module 220 may be part of such a server.

The service group(s) 202-M may each contain one or more clients 208. The clients 208 may include desktop computing devices, portable and hand held computing devices (e.g., laptop computers, cellular telephones, personal digital assistants, etc.), and/or other computing devices, as well as computing devices integrated into manufacturing equipment. It is understood that these are only examples and that the clients 208 may include any device containing data that may access the information transfer system 200 either directly or indirectly. The clients 208 may store process instructions, process logs, and/or other operational instructions, and may communicate with other entities through wired or wireless connections. Wired connections may include LAN, WAN, Ethernet, and/or other direct wire connections and protocols, while wireless connections may include BlueTooth®, 802.11b, 802.11g, and/or other wireless communication protocols.

The clients 208 may be assigned to one of the service groups 202-M, although it is understood that a client itself may represent a service group. The service groups 202-M may represent, for example, a cluster of tools, a number of customers assigned to a particular fabrication facility, an engineering section, a work group operation section, or any other grouping that is desirable. In some embodiments, each service group may be further divided into subgroups. For example, there may be a manufacturing group with a product design subgroup, a manufacturing process subgroup, an administration subgroup, an information technology subgroup, and/or other subgroups. The service groups 202-M may be assigned priority levels, as described with respect to FIGS. 1 and 2. Furthermore, each service group may be assigned a backup name that may be used by the service group to request an identity of the storage device that is designated for storing information coming from that service group.

The storage devices 210-N may each include one or more virtual or physical storage devices able to store information. Each storage device may have a single memory or may include multiple memories, which may be segmented or distributed. It is understood that the term memory includes any medium capable of storing data, including magnetic and optical media. Accordingly, a storage device may be a tape, disk, compact disk, hard drive, flash memory card, or any other type of magnetic and/or optical storage, or may be a storage device based on other technologies. In addition, each storage device may be associated with a service level, which may take into account such factors as the storage device's availability, capacity, performance, and/or other features. Furthermore, each storage device may include one or more MAC addresses associated with one or more NICs. If a storage device has multiple NICs, it is understood that inbound and outbound traffic may be balanced among the NICs using a traffic balancing module.

As described above, the resource module 220 includes the resource engine 222, the resource monitor 224, the backup table 226, the scenarios 228, and the GUI 230. The resource monitor 224 is responsible for monitoring the storage devices 210-N. Such monitoring may include monitoring the availability of each storage device, monitoring an available capacity of each storage device, and similar operations. The resource monitor 224 may supply the resource engine 222 with the monitoring data.

The backup table 226 associates the backup name of each service group 202-M with an address or other identifier of at least one storage device 210-N. In some examples, the backup table 226 may include a status of each storage device. The status may be based on the service level (e.g., availability, performance, and capacity) of each storage device. However, in the present example, such a status need not be explicitly recorded as the address or other identifier may be changed based on the status. The backup table 226 may be updated by the resource engine 222 based on the information supplied by the resource monitor 224 and the scenarios 228. In some examples, the backup table 226 may also be altered by a system administrator and/or a user via the GUI 230. The resource engine 222 may keep all change records of backup table 226. When any service group 202-M needs to retrieve previous backup data, the resource engine 222 informs them of the associated network identifier or address by looking up a restore timestamp and change history in the backup table 226.

The scenarios 228 may be used by the resource engine 222 to determine which of a plurality of virtual service paths should be used based, at least in part, on the information provided by the resource monitor 224. For example, a scenario may define that, if the storage device 212 is unavailable or has no additional capacity, traffic destined for the storage device 212 should be rerouted. The rerouting may be predetermined (e.g., reroute all traffic to the storage device 210), it may be dynamically determined (e.g., reroute all traffic to the storage device having the least load) or it may be a combination of predetermined and dynamically criteria (e.g., split the traffic into two portions based on priority and route each portion to the two storage devices having the most available bandwidth). Furthermore, in some embodiments, the service groups may be queued based on priority level or other criteria (e.g., time elapsed since previous backup) to ensure that certain service groups are backed up before other service groups.

It is understood that many different scenarios may be constructed, with each scenario dealing with different variations of a similar occurrence. For example, a single scenario may be constructed to deal with the unavailability of the storage device 212, or multiple scenarios may be constructed based on the unavailability of the storage device 212 and a combination of one or more other factors, such as the number or priority of service groups attempting to access the storage device 212 when the unavailability occurs.

The GUI 230 may be used to manually set virtual backup paths, service group backup names, etc., and these changes may be implemented by the resource engine 222.

Figure 6:
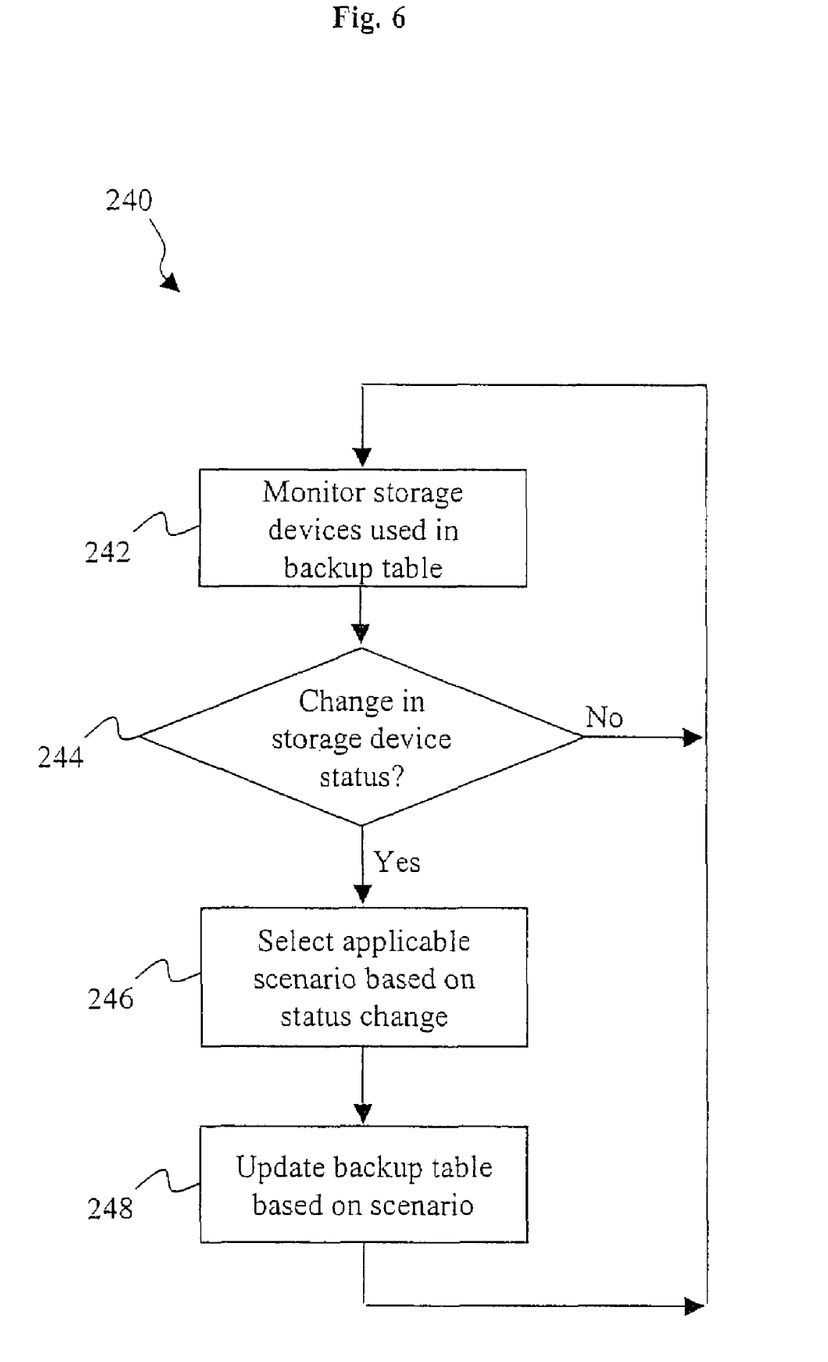
FIG. 6 is a flow chart of an exemplary method that may be executed within the system of FIG. 5 to update the backup table.

Referring now to FIG. 6 and with continued reference to FIG. 5, a method 240 may be used to monitor the status of one or more storage devices and modify a virtual backup service path based on the status. In step 242, one or more of the storage devices 210-N may be monitored by the resource monitor 224 to determine the status of each storage device. It is noted that, in some embodiments, the resource monitor 224 may monitor only the status of storage devices listed in the backup table 226 (as in the present example), while in other embodiments, the resource monitor 224 may monitor the status of all or a predefined group of storage devices.

In step 244, a determination is made as to whether a status change has occurred in any of the monitored storage devices. The status change may indicate that the storage device is unavailable due to failure or maintenance purposes, or it may indicate that the storage device has exhausted a resource such as available capacity. If no status change has occurred, the method 240 returns to step 242. However, if a status change has occurred, the method 240 continues to step 246, where a scenario is selected from the predefined scenarios based on the status change. For example, if the storage device 212 is unavailable and the other storage engines are available, the resource engine 222 may select a scenario that accounts for this situation. In step 248, the resource engine 222 may update the backup table 226 based on the selected scenario. This may include updating an address or other identifier that is associated with a backup name to ensure that the address identifies an available storage device 210-N. Using the identifier, one of the service groups 202-M may store data directly to one or more of the storage devices 210-N, as indicated by the line 228.

Figure 7:
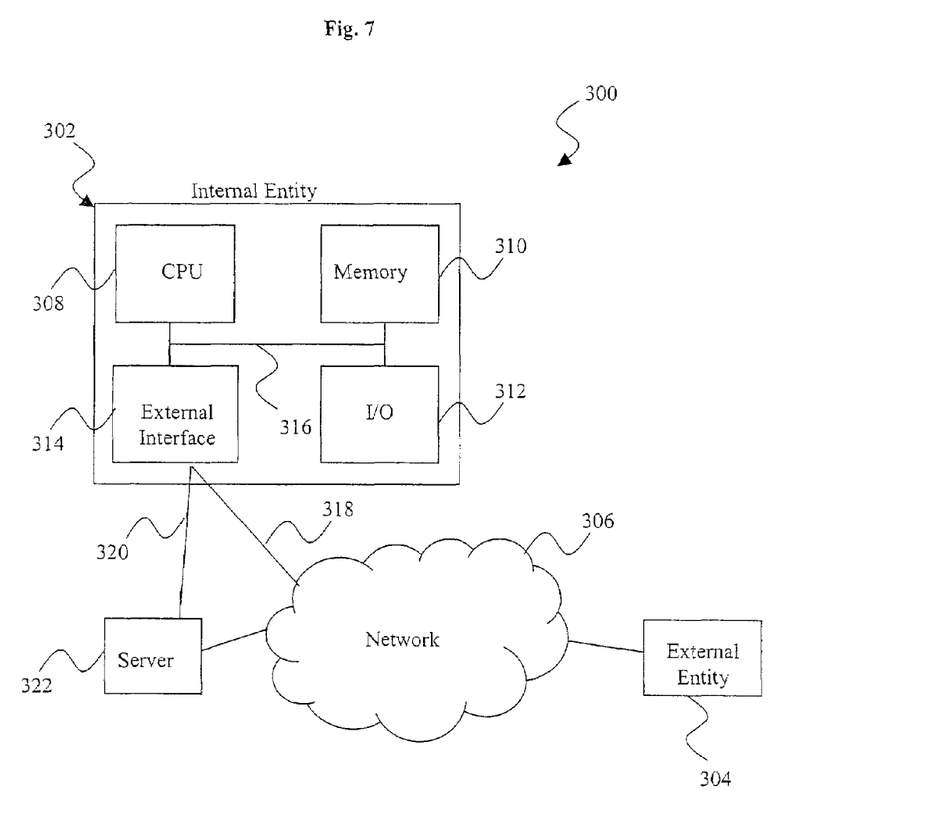
FIG. 7 illustrates a schematic view of an exemplary integrated circuit fabrication system within which the systems of FIGS. 1 and 5 may be implemented.

Referring now to FIG. 7, a virtual IC fabrication system (a "virtual fab") 300 provides an exemplary environment within which the information transfers systems 100 and 200 (FIGS. 1 and 5, respectively) may be implemented. The virtual fab 300 includes a plurality of entities represented by one or more internal entities 302 and one or more external entities 304 that are connected by a communications network 306. The network 306 may be a single network or may be a variety of different networks, such as an intranet and the Internet, and may include both wireline and wireless communication channels.

Each of the entities 302, 304 may include one or more computing devices such as personal computers, personal digital assistants, pagers, cellular telephones, and the like. For the sake of example, the internal entity 302 is expanded to show a central processing unit (CPU) 308, a memory unit 310, an input/output (I/O) device 312, and an external interface 314. The external interface may be, for example, a modem, a wireless transceiver, and/or one or more network interface cards (NICs). The components 308-314 are interconnected by a bus system 316. It is understood that the internal entity 302 may be differently configured and that each of the listed components may actually represent several different components. For example, the CPU 308 may actually represent a multi-processor or a distributed processing system; the memory unit 224 may include different levels of cache memory, main memory, hard disks, and remote storage locations; and the I/O device 312 may include monitors, keyboards, and the like.

The internal entity 302 may be connected to the communications network 306 through a wireless or wired link 318, and/or through an intermediate network 320, which may be further connected to the communications network. The intermediate network 320 may be, for example, a complete network or a subnet of a local area network, a company wide intranet, and/or the Internet. The internal entity 302 may be identified on one or both of the networks 306, 320 by an address or a combination of addresses, such as a MAC address associated with the network interface 314 and an IP address. Because the internal entity 202 may be connected to the intermediate network 320, certain components may, at times, be shared with other internal entities. Therefore, a wide range of flexibility is anticipated in the configuration of the internal entity 302. Furthermore, it is understood that, in some implementations, a server 322 may be provided to support multiple internal entities 302. In other implementations, a combination of one or more servers and computers may together represent a single entity.

In the present example, the internal entities 302 represents those entities that are directly responsible for producing the end product, such as a wafer or individually tested IC devices.

Examples of internal entities 302 include an engineer, customer service personnel, an automated system process, a design or fabrication facility and fab-related facilities such as raw-materials, shipping, assembly or test. Examples of external entities 304 include a customer, a design provider, and other facilities that are not directly associated or under the control of the fab. In addition, additional fabs and/or virtual fabs can be included with the internal or external entities. Each entity may interact with other entities and may provide services to and/or receive services from the other entities.

It is understood that the entities 302, 304 may be concentrated at a single location or may be distributed, and that some entities may be incorporated into other entities. In addition, each entity 302, 304 may be associated with system identification information that allows access to information within the system to be controlled based upon authority levels associated with each entities identification information.

The virtual fab 300 enables interaction among the entities 302, 304 for purposes related to IC manufacturing, as well as the provision of services. In the present example, IC manufacturing can include one or more of the following steps:
  receiving or modifying a customer's IC order of price, delivery, and/or quantity;
  receiving or modifying an IC design;
  receiving or modifying a process flow;
  receiving or modifying a circuit design;
  receiving or modifying a mask change;
  receiving or modifying testing parameters;
  receiving or modifying assembly parameters; and
  receiving or modifying shipping of the ICs.

One or more of the services provided by the virtual fab 300 may enable collaboration and information access in such areas as design, engineering, and logistics. For example, in the design area, the customer 304 may be given access to information and tools related to the design of their product via the fab 302. The tools may enable the customer 304 to perform yield enhancement analyses, view layout information, and obtain similar information. In the engineering area, the engineer 302 may collaborate with other engineers 302 using fabrication information regarding pilot yield runs, risk analysis, quality, and reliability. The logistics area may provide the customer 304 with fabrication status, testing results, order handling, and shipping dates. It is understood that these areas are exemplary, and that more or less information may be made available via the virtual fab 300 as desired.

Another service provided by the virtual fab 300 may integrate systems between facilities, such as between a facility 304 and the fab facility 302. Such integration enables facilities to coordinate their activities. For example, integrating the design facility 304 and the fab facility 302 may enable design information to be incorporated more efficiently into the fabrication process, and may enable data from the fabrication process to be returned to the design facility 304 for evaluation and incorporation into later versions of an IC.

Although only a few example embodiments of this disclosure have been described in detail above, those skilled in the art will readily appreciate that many modifications are possible in the example embodiments. For example, although IP addresses are used as exemplary network identifiers, it is understood that other network identifiers may be used. In addition, although the server 120 is described as a DNS server for purposes of example, it is understood that other network mapping devices and/or protocols may be used. Furthermore, although not shown, other network devices such as routers, proxy servers, etc., may be used in the information transfer systems described above. Such devices may be used in addition to the illustrated components or, in some embodiments, may replace one or more of the illustrated components. Also, each component may include software and/or hardware and may be implemented differently. Accordingly, all such modifications are intended to be included in the scope of this disclosure as defined in the following claims. In the claims, means-plus-function clauses are intended to cover the structures described herein as performing the recited function and not only structural equivalents, but also equivalent structures.

What is claimed is:

1. A method for using a plurality of virtual backup service paths to dynamically switch between storage devices based on a plurality of backup scenarios, the method comprising:
    defining a plurality of backup service groups containing at least one client;
    defining a plurality of scenarios that each reference at least one virtual backup service path, wherein each virtual backup service path is defined by at least one network address identifying one of the storage devices;
    determining which scenario of the plurality of scenarios is applicable based on a service level of the storage devices;
    selecting the virtual backup service path identified by the applicable scenario; and
    assigning a priority level to at least some of the backup service groups, wherein the priority level is used when determining which scenario is applicable.

2. The method of claim 1 wherein the service level of the storage devices includes at least one of an availability, a capacity, and a performance of the respective storage device.

3. The method of claim 2 further comprising receiving a notification that the storage device cannot be used based on the service level of the storage device.

4. A method for using a plurality of virtual backup service paths to dynamically switch between storage devices based on a plurality of backup scenarios, the method comprising:
    defining a plurality of backup service groups containing at least one client;
    defining a plurality of scenarios that each reference at least one virtual backup service path, wherein each virtual backup service nath is defined by at least one network address identifying one of the storage devices;
    determining which scenario of the plurality of scenarios is applicable based on a service level of the storage devices;
    selecting the virtual backup service path identified by the applicable scenario;
    assigning a priority level to at least some of the backup service groups; and
    providing an order in which information from the backup service groups will be stored based on their priority level.

5. A method for dynamically switching to a second storage device when a service level of a first storage device indicates that the first storage device cannot be used, wherein the first and second storage devices are identified on a network by first and second network identifiers, respectively, the method comprising:
    receiving a request from a first service group having a backup name, wherein the request is for a network identifier currently assigned to the backup name;
    determining whether the first storage device can be used based on the service level of the first storage device, wherein the first network identifier is currently assigned to the backup name;
    assigning the second network identifier to the backup name if the first storage device cannot be used; and
    responding to the request with the first network identifier if the first network identifier is currently assigned to the backup name or with the second network identifier if the second network identifier is currently assigned to the backup name.

6. The method of claim 5 further comprising assigning a priority level to the first service group.

7. The method of claim 5 further comprising storing information from the first service group to the first or second storage device associated with the first or second network identifier, respectively, identified in the response to the request.

* * * * *